(12) United States Patent
Matsuda

(10) Patent No.: US 10,277,579 B2
(45) Date of Patent: Apr. 30, 2019

(54) INFORMATION PROCESSING SYSTEM THAT PROVIDES A RESOURCE TO AN APPLICATION OF A TERMINAL THROUGH A NETWORK

(71) Applicant: CANON KABUSHIKI KAISHA, Tokyo (JP)

(72) Inventor: Kotaro Matsuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 146 days.

(21) Appl. No.: 14/972,874

(22) Filed: Dec. 17, 2015

(65) Prior Publication Data

US 2016/0205091 A1    Jul. 14, 2016

(30) Foreign Application Priority Data

Jan. 9, 2015   (JP) ................................. 2015-003514

(51) Int. Cl.
| | |
|---|---|
| *H04W 12/06* | (2009.01) |
| *H04L 29/06* | (2006.01) |
| *H04W 4/60* | (2018.01) |
| *G06F 21/35* | (2013.01) |

(52) U.S. Cl.
CPC .......... *H04L 63/0823* (2013.01); *H04W 4/60* (2018.02); *H04W 12/06* (2013.01)

(58) Field of Classification Search
None
See application file for complete search history.

(56) References Cited

U.S. PATENT DOCUMENTS

| | | | |
|---|---|---|---|
| 6,418,472 B1* | 7/2002 | Mi ....................... | G06F 21/6218 709/202 |
| 8,739,263 B2* | 5/2014 | Azuma ................... | G06F 21/35 713/172 |
| 8,745,711 B2 | 6/2014 | Matsuda | |
| 8,763,100 B2* | 6/2014 | Tie ......................... | H04L 9/3213 380/46 |

(Continued)

FOREIGN PATENT DOCUMENTS

JP    2010-282322    12/2010

OTHER PUBLICATIONS

Identity as a Service—Towards a Service-Oriented Identity Management Architecture. Emig et al. LNCS(2007).*

(Continued)

*Primary Examiner* — Venkat Perungavoor
(74) *Attorney, Agent, or Firm* — Venable LLP

(57) ABSTRACT

There are provided a beacon authentication API that obtains identification information of a terminal and performs authentication if a resource is provided to an application of a terminal via network and if the terminal receives a beacon transmitted from a beacon transmitter, and an authorization API that issues an authorization token if the authentication is performed by the beacon authentication API, wherein the authorization API verifies whether or not the authorization token is valid if there is a call request of the resource by using the authorization token from the terminal, and wherein the beacon authentication API permits the application to use the resource in accordance with the content of an event based on the beacon if the authorization token is verified to be valid.

11 Claims, 14 Drawing Sheets

(56) References Cited

U.S. PATENT DOCUMENTS

| | | | |
|---|---|---|---|
| 8,938,785 B2* | 1/2015 | Coughlin | H04W 12/06 709/228 |
| 2005/0076244 A1* | 4/2005 | Watanabe | H04W 12/06 726/4 |
| 2007/0186105 A1* | 8/2007 | Bailey | H04L 63/0492 713/168 |
| 2009/0132813 A1* | 5/2009 | Schibuk | G06Q 20/223 713/158 |
| 2009/0217033 A1* | 8/2009 | Costa | H04L 63/08 713/155 |
| 2010/0088752 A1* | 4/2010 | Nagulakonda | H04L 9/3226 726/6 |
| 2010/0281252 A1* | 11/2010 | Steeves | H04L 9/3213 713/155 |
| 2014/0131434 A1* | 5/2014 | Ozkan | G06Q 10/087 235/375 |
| 2014/0245461 A1* | 8/2014 | O'Neill | G06F 21/60 726/28 |
| 2014/0279479 A1* | 9/2014 | Maniar | G06Q 20/36 705/41 |
| 2015/0071181 A1* | 3/2015 | Nasir | H04W 28/20 370/329 |
| 2015/0193600 A1 | 7/2015 | Matsuda | |
| 2015/0220917 A1* | 8/2015 | Aabye | H04L 9/3268 705/64 |
| 2015/0221149 A1* | 8/2015 | Main | G07C 9/00119 340/5.61 |
| 2015/0271676 A1* | 9/2015 | Shin | H04W 12/08 713/168 |

OTHER PUBLICATIONS

Device Data Protection in Mobile Healthcare Applications. Weerasinghe et al. LNICST(2009).*

* cited by examiner

FIG. 5A

Use registration

501 — 1. Input of user information

Email address: aaa@bbb.com

Password: ************

502 — 2. Selection of price menu

| Selection | Menu name | Maximum number of API calls (per month) | Unit price of charging unit (per month) |
|---|---|---|---|
| ⊙ | M-A | 100 | ¥100 |
| ○ | M-B | 1,000 | ¥500 |
| ○ | M-C | 10,000 | ¥3,000 |

503 — [Registration]

FIG. 5B

API access permission setting (scope setting)

511 —
○ Non-use of scope
⊙ Use of scope

512 —

| API | URI | Scope |
|---|---|---|
| A | /api/a/create | a_write |
| B | /api/a/update | a_write |
| C | /api/a/read | a_read |

513 — [Setting] [Cancel]

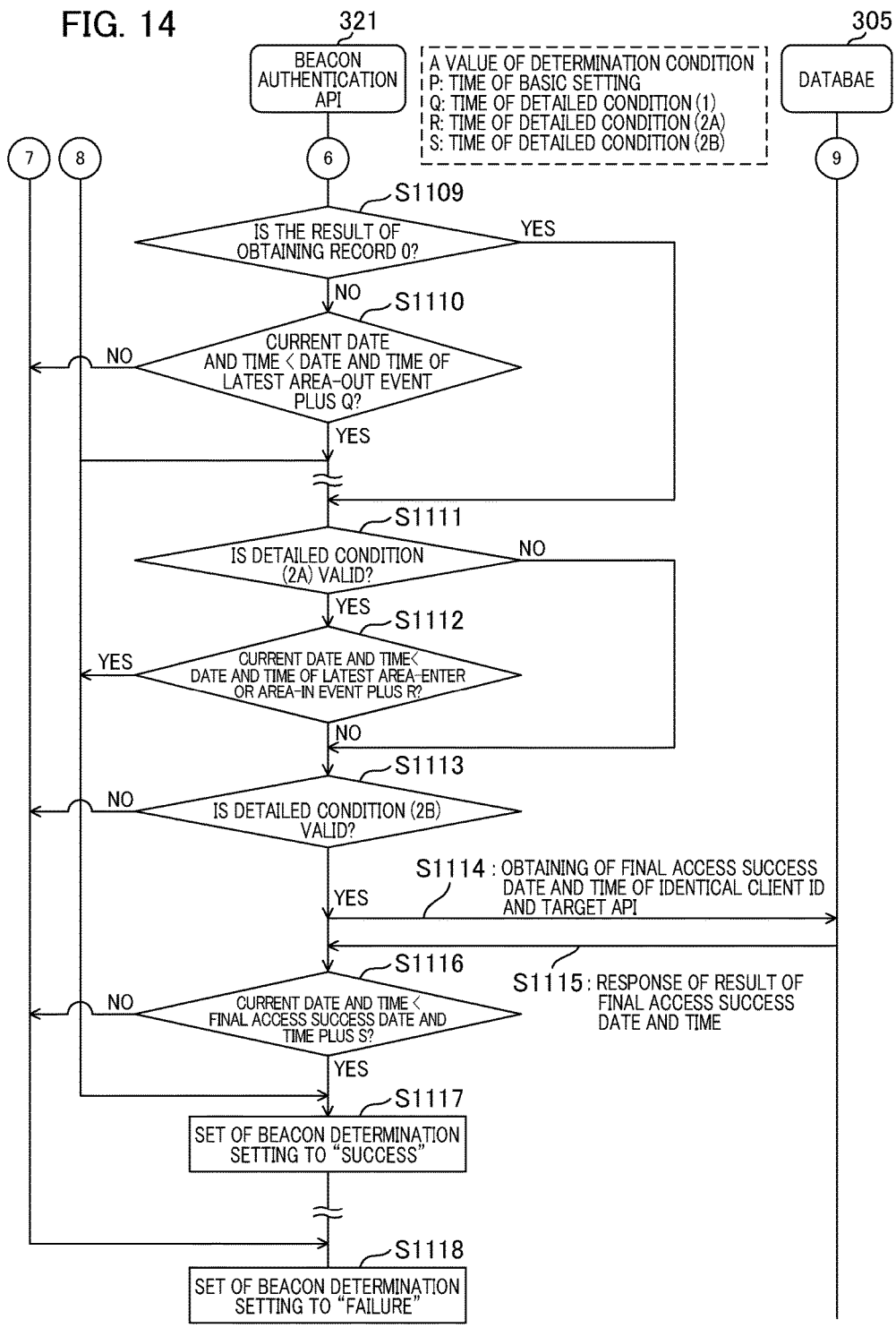

INFORMATION PROCESSING SYSTEM THAT PROVIDES A RESOURCE TO AN APPLICATION OF A TERMINAL THROUGH A NETWORK

BACKGROUND OF THE INVENTION

Field of the Invention

The present invention relates to an information processing system, a control method of an information processing apparatus, and a storage medium.

Description of the Related Art

In recent years, mobile terminals, for example, a smartphone and a tablet computer, are rapidly spreading. Accordingly, there is a mechanism that enables easily publishing or selling a developed application for such a mobile terminal through an application store or the like on the internet. Additionally, in the application development for the mobile terminals, there is also a service business that provides a function, which is difficult to be achieved in the mobile terminal alone, as a Web service on the internet and that collects a Web service use fee. Particularly, a model for providing Web service, referred to as "BaaS (Backend as a Service)", which does not require code development on the server-side and server operation and charges only for the use of the Web service API has, entered into the market.

Additionally, in recent years, a product and service in which a beacon is disposed in a store or the like, and the mobile terminal can be used as a beacon receiver by using a wireless communication standard referred to as "Bluetooth (registered trademark) Low Energy", is in the process of spreading. For example, there is a use case, for example, in which a coupon is delivered to the mobile terminal when the mobile terminal is detected to have entered in an area of the beacon.

Moreover, as other use cases of the applications that utilize beacon information in a case where a local limited item is delivered in a game application, there are a case having a limit of the number, that is, the delivery of the item is only one-time in the area of the beacon, and a case in which the coupons can be issued up to a total of 10 times and the location for the issue is not limited.

Additionally, in a case where a personal mobile terminal accesses an intracompany resource, there is a case in which the internal resource is available only when the mobile terminal is in the area of the beacon (in the company building), and the internal resource is not available when the mobile terminal has moved outside of the area. Subsequently, in order to achieve a variety of use cases as described above, it is necessary to restrict the range and number of available resources in accordance with the area information of the beacon that has been received by the mobile terminal.

Additionally, Japanese Patent Laid-Open No. 2010-282322, discloses a technique in which a pseudolite and an authentication server share information about the disposition and an authentication ID to ensure the validity of a signal transmitted from the pseudolite, and the access to the internal system is permitted only from an electronic device at a predetermined position.

Japanese Patent Laid-Open No. 2010-282322, discloses a technique in which the pseudolite and the authentication server ensure the validity of the signal, and permits access to the internal system only from the electronic device at the predetermined position. However, it is not possible to provide a mechanism for API authentication and authorization that restricts the range and number of the resource to be used. For example, when the mobile terminal enters the area of beacon and service is provided to this mobile terminal, it is impossible to provide a secure mechanism for API authentication and authorization that is available for an application developer.

SUMMARY OF THE INVENTION

The present invention provides an information processing system that easily enables permitting and restricting the range and number of available resources in accordance with the identification information of a beacon received by a mobile terminal.

The information processing system according to the present invention is an information processing system that provides a resource to an application of a terminal through a network, comprising: an authentication unit that obtains identification information of the terminal and performs authentication of the terminal if the terminal receives a beacon transmitted from a transmitter; an authorization unit that issues an authorization token if the authentication is performed by the authentication unit, wherein the authorization unit verifies whether or not the authorization token is valid if there is a call request of the resource by using the authorization token from the terminal, and wherein the authentication unit permits the application of the terminal to use the resource in accordance with the content of an event based on the beacon if the authorization unit verifies the authorization token is valid.

According to the present invention, in accordance with the identification information of beacon received by the terminal, the range and number of available resources can easily be permitted and limited.

Further features of the present invention will become apparent from the following description of exemplary embodiments (with reference to the attached drawings).

BRIEF DESCRIPTION OF THE DRAWINGS

FIGS. 5A and 5B illustrate an example of a use registration screen and an API access permission setting screen.

FIG. 14 is a sequence diagram of the beacon condition determination processing.

DESCRIPTION OF THE EMBODIMENTS

Hereinafter, a description will be given of a an information processing system, a control method of information processing system, and a computer program that are the best mode for carrying out the present invention with reference to attached drawings and the like.

In the present embodiment, a configuration conforming to OAuth 2.0, which is an Internet standard, is used for providing a secure API (Application Program Interface) authorization means from Web service to an application. Particularly, in order to enable an access control for each terminal to an application for a mobile terminal, an API authorization means using a Client Credentials Grant of OAuth 2.0 is provided.

Figure 1:
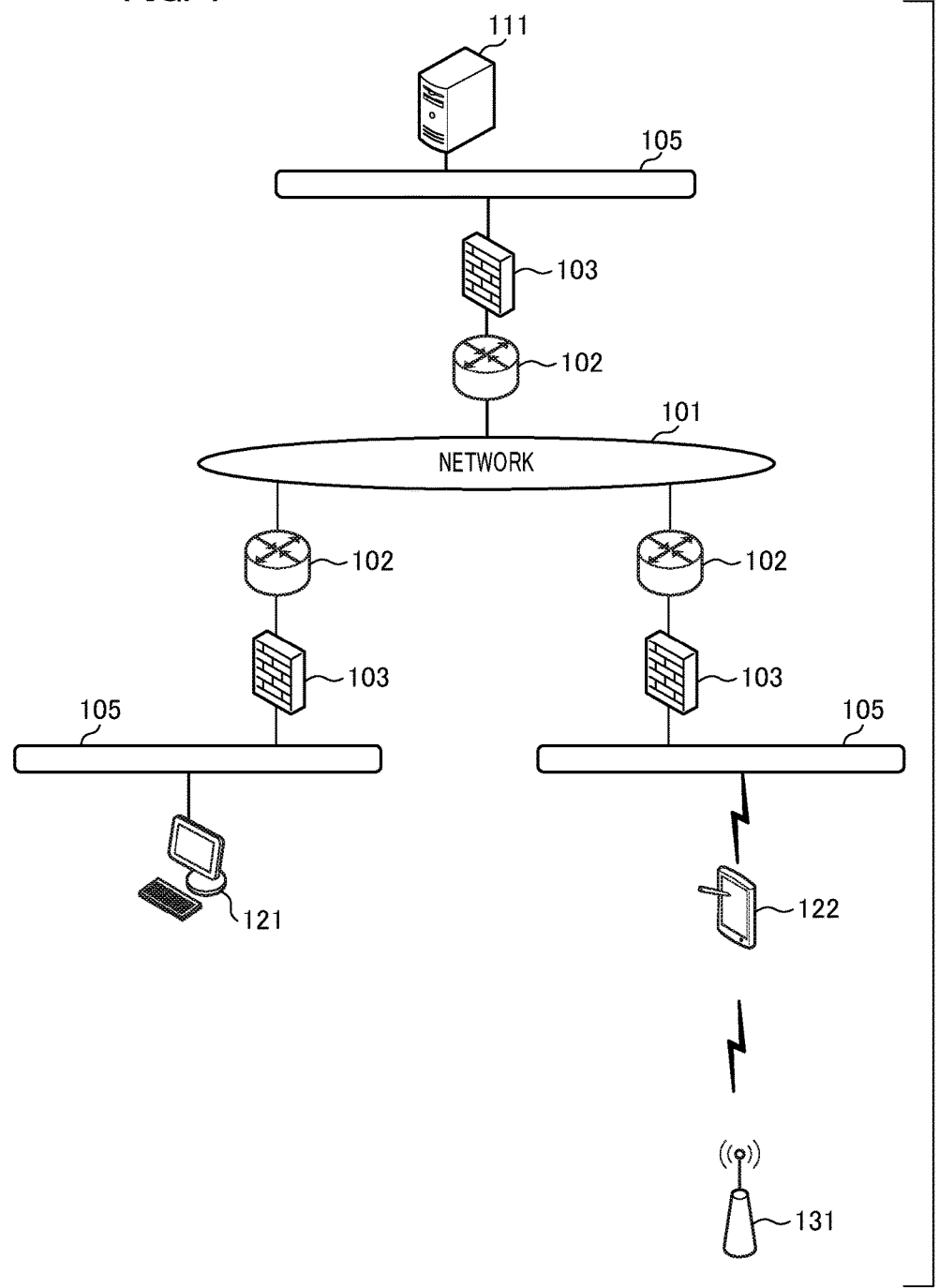
FIG. 1 illustrates a configuration of an entire system according to an embodiment of the present invention.

FIG. 1 illustrates a configuration of the entire information processing system according to the present embodiment. First, a network 101 may be a base for performing communications between devices, and may be the internet or intranet. A network device 102 may be a router or a switch that connects networks together. A firewall 103 controls the communication permission between the networks. A LAN (Local Area Network) 105 is a terminal network connecting with a device such as a computer, not limited to a wired communication network, and may be a wireless communication network such as a wireless LAN or a mobile phone communication network.

An application server 111 is connected via the network 101, and enables data communication with client computers (terminals) 121 and 122. The client computers 121 and 122 may be, for example, a personal computer, a tablet computer, or a smart phone. A beacon transmitter 131 (transmitting device) is provided with a beacon receiving function, and is capable of transmitting and receiving information to and from the client computer 122 through the wireless communication.

Figure 2:
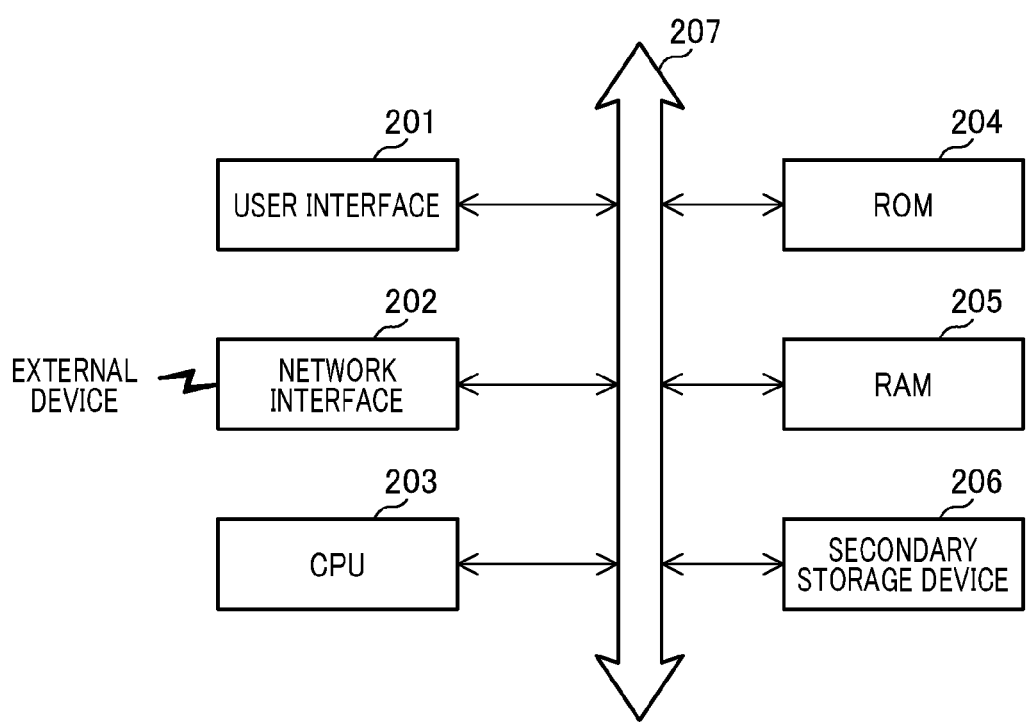
FIG. 2 illustrates a hardware configuration of an information processing apparatus.

FIG. 2 illustrates hardware configurations of the application server 111 and the client computers 121 and 122. A user interface 201 is a display, a keyboard, a mouse, a touch panel, and the like, and performs the input and output of information. Note that a computer that does not include this hardware can be connected or operated from another computer through a remote desk top or a remote shell.

A network interface 202 is connected to a network such as a LAN, and communicates with another computer and another network device. A resident program and data are recorded in a ROM (Read Only Memory) 204. A RAM (Random Access Memory) 205 is a temporary memory region of a CPU 203. A HDD (Hard Disk Drive) 206 is a secondary storage device. The CPU (Central Processing Unit) 203 executes a program that was read, for example, from the ROM 204, the RAM 205, or the HDD 206. Each unit is connected through an input-output interface 207.

Figure 3A:
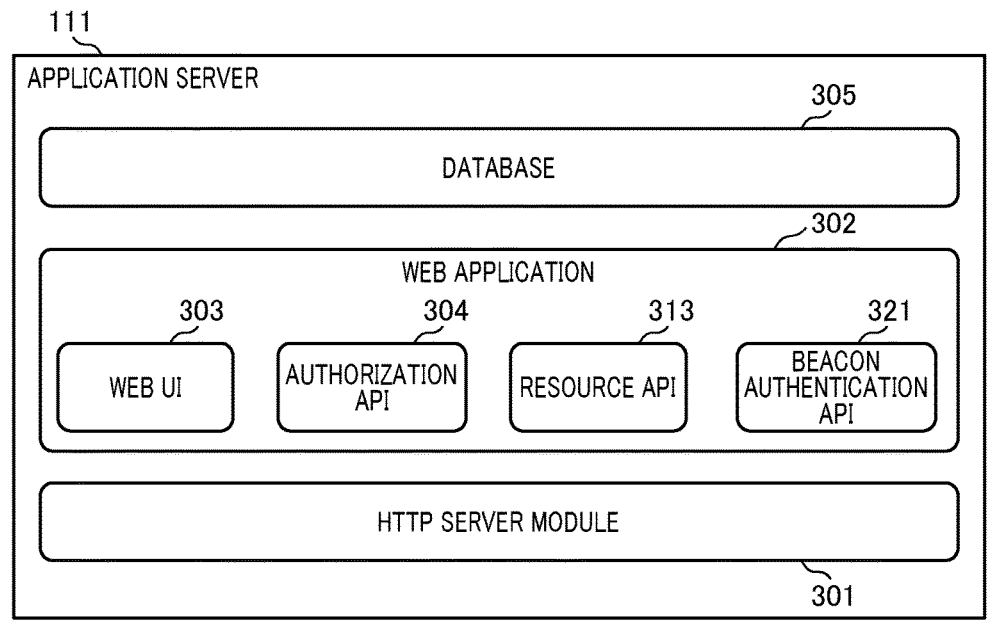
FIGS. 3A to 3C illustrate a software configuration according to the system of the present invention.
Figure 3B:
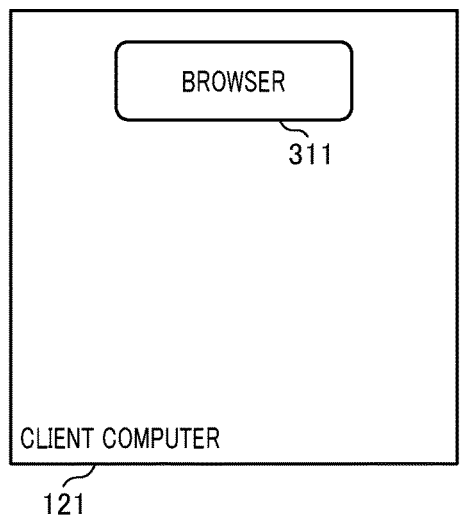
Figure 3C:
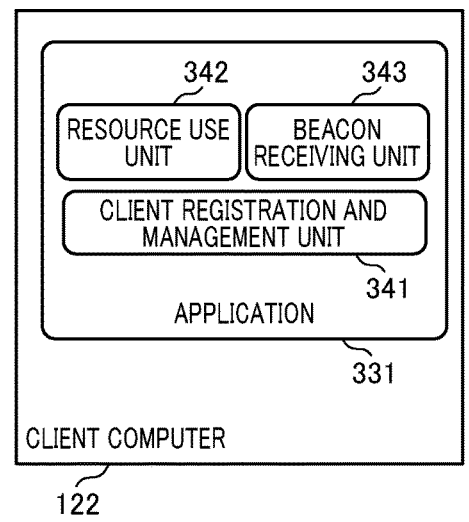

FIGS. 3A to 3C illustrate a software configuration according to the system of the present embodiment. The application server 111 includes an HTTP server module 301, a Web application 302, and a database 305. The HTTP server module 301 manages and controls the communication about a request and a response for Web access from the client, and forwards the request to the Web application 302 as necessary. The Web application 302 includes a Web UI 303 that provides a Web document such as HTML and an operation screen to a browser, and an authorization API 304 that accepts authorization processing via the Web service API as typified by "REST".

Additionally, the Web application 302 includes a resource API 313 that accepts various types of processing via the Web service API as typified by "REST". The resource API 313 executes necessary processes such as the addition, read-out, update, or deletion of data, generates a response to an API call request from the client, and returns the response to the client through the HTTP server module 301. Note that various functions can be considered as a function provided from the resource server. Accordingly, if the process can only be executed by the Web application 302, it is also possible to obtain a response by requesting another application or another server (not illustrated) to execute the functions to.

Additionally, the Web application 302 includes a beacon authentication API 321 that performs the authentication processing of the beacon transmitter 131 and the management of beacon information. The database 305 stores various data used by the Web application 302. The database 305 performs the addition, read-out, update, or deletion of a record on various tables in response to a request from the Web application 302. Note that, in FIGS. 3A to 3C, although the Web UI 303, the authorization API 304 (authorization means), the resource API 313, and the beacon authentication API 321 are illustrated so as to be configured in the one application server 111, they may also be configured in separate servers. Similarly, the database 305 may also be configured in another server.

Next, a browser 311 included in the client computer 121 receives and displays the Web documents such as HTML and the operation screen provided from Web UI 303, and transmits, for example, the operation result by the user to the Web UI 303. Additionally, an application 331 included in the client computer 122 includes a client registration and management unit 341, a resource use unit 342, and a beacon receiving unit 343. The client registration and management unit 341 manages in response to the issuance of a unique client ID for each instance of the application 331 from the authorization API 304.

The resource use unit 342 calls the resource API 313, and executes, for example, the addition, read-out, update, or deletion of data that is necessary for the operation of the application 331. The beacon receiving unit 343 uses a communication function by a beacon included in the client computer 122, communicates with the beacon transmitter 131, and transmits and receives necessary information. Additionally, the beacon receiving unit 343 calls the beacon authentication API 321, and performs the relay of the authentication processing of the beacon transmitter, and the transmission and receipt of the beacon information.

Here, in the configurations of FIGS. 3A to 3C, a description will be given of a role that corresponds to OAuth 2.0 for each module. The authorization API 304 has the role of Authorization Server of OAuth 2.0. The resource API 313 has the role of Resource Server role of OAuth 2.0. The application 331 has the role of Client and the role of Resource Owner of OAuth 2.0. In the following description, each module executes an API authorization flow serving as the role of OAuth. Note that the "client" in the specification or drawings indicates the individual applications 331 that operate as the requesting source of the Web service API, for example, the authorization API 304 and the resource API 313, as the Client role of OAuth 2.0.

Tables 1 to 9 show various tables of the database 305 included in the application server 111.

TABLE 1

| TENANT MANAGEMENT TABLE |
| --- |
| TENANT ID |
| TN001 |
| TN002 |

Table 1 is a tenant management table. The tenant management table includes columns that store a tenant ID. The tenant ID is a unit for securely separating the resource when the Web service provided by the application server is used for various organizations and individuals. The system as described above is commonly referred to as a multi-tenant system.

TABLE 2

| USER MANAGEMENT TABLE | | | | |
| --- | --- | --- | --- | --- |
| TENANT ID | USER ID | EMAIL ADDRESS | PASSWORD | AUTHORITY |
| TN001 | UO01@TN001 | aaa@bbb.com | ********* | TENANT ADMINISTRATOR |
| TN002 | UO02@TN002 | xxx@yyy.com | ********* | GENERAL USER |

Table 2 is a user management table. The user management table includes columns that store a tenant ID of the tenant to which the user belongs, columns that store a user ID, columns that store a user's email address, columns that store a user's password, and columns that store authority that has been granted in the tenant to which the user belongs. In the present embodiment, there are user authorities including "tenant administrator" having authority over all of data in the tenant, and "general user" having only limited authority.

TABLE 3

| CLIENT MANAGEMENT TABLE | | | | |
| --- | --- | --- | --- | --- |
| CLIENT ID | SECRET | TENANT ID | TYPE | DN |
| U001@TN001 | ********* | TN001 | MASTER | CN = U001. OU = TN001 |
| 053753a39d3e4e6482de@TN001 | ********* | TN001 | GENERAL | |
| 937251b22cc891de291@TN001 | ********* | TN001 | GENERAL | |

Table 3 is a client management table. The client management table includes columns that store the client ID, and columns that save client's secret. Additionally, the client management table includes columns that store the tenant ID to which the client belongs, and columns that store the type of client. Note that, as the type of client, there are client authorities including "master" having management authority of the tenant, and "general user" having only limited authority. Additionally, the client management table includes columns that store a DN of the client, and individually identifies and manages the Client of OAuth 2.0.

TABLE 4

CLIENT CERTIFICATE MANAGEMENT TABLE

| SERIAL NUMBER | ISSUER | PRINCIPAL | START DATE | END DATE | TENANT MASTER DN |
|---|---|---|---|---|---|
| 00abcdef0001 | Root CA 01 | U001@TN001 | 2013 May 30 | 2015 May 30 | CN = U001, OU = TN001 |
| 00abcdef0002 | Root CA 01 | U001@TN002 | 2013 Sep. 30 | 2015 Sep. 30 | CN = U002, OU = TN002 |

Table 4 is a client certificate management table. The client certificate management table includes columns that store a serial number of the client certificate and columns that store an issuer of the certificate. Additionally, it includes columns that store a principal person of the certificate and columns that store the start date of the validity period of the certificate. Subsequently, it includes columns that store the end date and time of the validity period of the certificate and columns that store a tenant master DN (Distinguished Name).

TABLE 5

BEACON AUTHENTICATION OPTION MANAGEMENT TABLE

| TENANT ID | API/SCOPE TYPE | SETTING TARGET | OPTION SETTING | BECON IDENTIFICATION (proximity UUID, major, minor) | AVAILABLE AREA RESTRICTION TYPE | THE MAXIMUM NUMBER OF API USE | BEACON DETERMINATION CONDITION ID |
|---|---|---|---|---|---|---|---|
| TN001 | API | A | TRUE | BBB-111, 101, 7 | 1 | NONE | COND001 |
| TN001 | API | B | TRUE | YYY-8888, *, * | 2 | 10 | COND002 |
| TN001 | API | C | FALSE | | | | COND003 |
| TN002 | SCOPE | a_write | TRUE | ZZZ-8888, 22, * | 2 | 100 | COND001 |
| TN002 | Scope | a_read | FALSE | | | | COND002 |

Table 5 is a beacon authentication option management table. The beacon authentication option management table includes columns that store the tenant ID and columns that store a setting target of the beacon authentication option, which is a type of API or scope. Additionally, it includes columns that store API or scope, which is the setting target of the beacon authentication option, and columns that store a truth-value that indicates that the beacon authentication option is valid or invalid to the setting target. It includes columns that store the beacon identification information. In the present embodiment, an example in which a specification in a case of applying Bluetooth (registered trademark) Low Energy is used, and three values, that is, proximity UUID, major, and minor are stored is shown. When a symbol "*" is set as a value, it indicates that the setting is valid for any value. Additionally, Table 5 includes columns that store the type of the available area restriction and columns that store the API use maximum number for each setting target. It includes columns that store beacon determination condition ID.

TABLE 6

BEACON DETERMINATION CONDITION MANAGEMENT TABLE

| TENANT ID | BEACON DETERMINATION CONDITION ID | SETTING TYPE ID | SETTING VALIDITY | DETERMINATION TIME (SEC.) |
|---|---|---|---|---|
| TN001 | Cond001 | BA001 | | 300 |
| TN001 | COND001 | OP001 | TRUE | 600 |
| TN001 | COND001 | OP002A | FALSE | |
| TN001 | COND001 | OP002B | TRUE | 1200 |

Table 6 is a beacon determination condition management table. The beacon determination condition management table includes columns that store the tenant ID and columns that store the beacon determination condition ID. Additionally, it includes columns that store a setting type ID, columns that store a truth-value indicating that the setting is valid or invalid, and columns that store a determination time for each setting.

TABLE 7

BEACON EVENT MANAGEMENT TABLE

| DATE AND TIME | BEACON IDENTIFICATION INFORMATION (proximity UUID, major, minor) | EVENT | CLIENT ID |
|---|---|---|---|
| 2013 Jun. 2 13:07:52 | BBB-1111, 101, 32 | AREA-ENTER | 053753a39d3e4e6482de@TN001 |
| 2013 Jun. 2 13:10:22 | BBB-1111, 101, 32 | AREA-IN | 053753a39d3e4e6482de@TN001 |
| 2013 Jun. 2 13:12:46 | BBB-1111, 101, 32 | AREA-OUT | 053753a39d3e4e6482de@TN001 |
| 2013 Jun. 2 15:54:03 | NNN -7777, 19, 3 | AREA-ENTER | 937251b22ccc891de291@TN001 |

Table 7 is a beacon event management table. The beacon event management table includes columns that store the date and time of the event, and columns that store the beacon identification information. Additionally, it includes columns that store the content of generation of the event, and columns that store the client ID, which is the origin of the event.

TABLE 8

AUTHORIZATION TOKEN MANAGEMENT TABLE

| AUTHO-RIZATION TOKEN ID | SCOPE | CLIENT ID | EXPIRATION PERIOD |
|---|---|---|---|
| AT_0000001 | | 053753a39d3e4e6482de@TN001 | 2013 May 30 24:00:00 |
| AT_0000002 | a_write | 937251b22ccc891de291@TN001 | 2013 Jun. 1 24:00:00 |
| AT_0000003 | a_read | 937251b22ccc891de291@TN001 | 2013 Jun. 2 24:00:00 |

Table 8 is an authorization token management table. The authorization token management table includes columns that store an authorization token ID and columns that store the scope. It includes columns that store the client ID of issuance target of the authorization token. It includes columns that store the expiration period of the authorization token.

TABLE 9

API CALL NUMBER MANAGEMENT TABLE

| CLIENT ID | TARGET API | THE NUMBER OF API USE | FINAL ACCESS SUCCESS DATE AND TIME |
|---|---|---|---|
| 053753a39d3e4e6482de@TN001 | A | 12 | 2013 May 30 09:44:32 |
| 053753a39d3e4e6482de@TN001 | B | 0 | |
| 053753a39d3e4e6482de@TN001 | C | 373 | 2013 Jun. 2 14:10:55 |
| 937251b22ccc891@TN001 | C | 6 | 2013 Jun. 1 20:12:03 |

Table 9 is an API call number management table. The API call number management table includes columns that store the client ID and columns that store the target API for the count of the API call number. Additionally, it includes columns that store the number of API use that has been used after the call from the client and columns that store a final access success date and time when the API has been called from the client.

Next, with reference to FIGS. 4, 5, 6 and 7, a description will be given of a process for the use registration in the Web service that is provided by the application server 111. Note that the user, who performs the use registration, is generally a developer of the application 331. First, the browser 311 requests the Web UI 303 to obtain a use registration screen 500 (step S401). Next, the browser 311 obtains the use registration screen 500 that is provided by the Web UI 303 (step S402), and displays it on the browser 311 (step S403).

Here, a description will be given of the use registration screen 500 shown in FIGS. 5A and 5B. A user information input field 501 is a field in which a user's email address or password is input. A price menu selecting field 502 is a field in which a price menu is selected. The Web UI 303 displays a screen that provides options of API charging menu to the price menu selecting field 502. In the present embodiment, although the example in which a metered charging is performed for the API call maximum number per month is presented, various types of charging system may be available. Note that, in the present embodiment, any charging system can be used. A registration button 503 is a button that transmits a use registration request.

Here, the description will return to FIG. 4. The user enters user information in the user information input field 501 and selects the price menu from the price menu selecting field 502. Subsequently, the user depresses the registration button 503, and transmits the use registration request to the Web UI 303 (step S404).

First, the Web UI 303 newly adds the tenant ID to the tenant management table shown in Table 1. Next, the Web UI 303 adds the user's record to the user management table shown in Table 2 in accordance with the user information that has been input, and grants "tenant administrator" to the column for "authority". Through the aforementioned process, the user can change the setting values of the tenant and the like that have been made. Additionally, the Web UI 303 makes a single client who is the "master" as the type column in the client management table shown in Table 3.

Next, the Web UI 303 makes a client certificate that holds a tenant master DN identical with the DN of the master client that has been produced, and stores other certificate information in the client certificate management table shown in Table 4 (step S405). Subsequently, when the registration processing is completed, the Web UI 303 responds to the browser 311 about this (step S406). Next, the browser 311 requests the Web UI 303 to obtain an API access permission setting screen 510 (step S407). Next, the Web UI 303 obtains the API access permission setting screen 510, responds to the browser 311 about this (step S408), and displays it on the browser 311 (step S409).

Here, a description will be given of the API access permission setting screen (scope setting) 510 shown in FIGS. 5A and 5B. A scope use selecting field 511 is a field that selects whether or not scope (Scope), which is an optional attribute of OAuth 2.0, is used. An API and a scope setting field 512 is a field that displays URI and the scope for each API. When the scope is not used, a legitimate client that has received the client authentication can issue the authorization token and call any API. In contrast, when the scope is used, a necessary scope for each API has been determined, and therefore the necessary scope is specified and the issuance of the authorization token is requested, depending on the use.

Subsequently, API is called by using the issued authorization token, the call of only API within the range of the scope is permitted, and the access becomes possible. The aforementioned processing allows dividing the access rights for each API in a unit of scope. Consequently, it is possible to permit only the access to the desired API from the client having the authorization token in which the scope is specified. When the setting button 513 is depressed, the setting request is transmitted from the browser 311 to the Web UI 303 (step S410). Subsequently, the browser 311 saves the input setting value (step S411), and responds to the setting request (Step S412).

Figure 4:
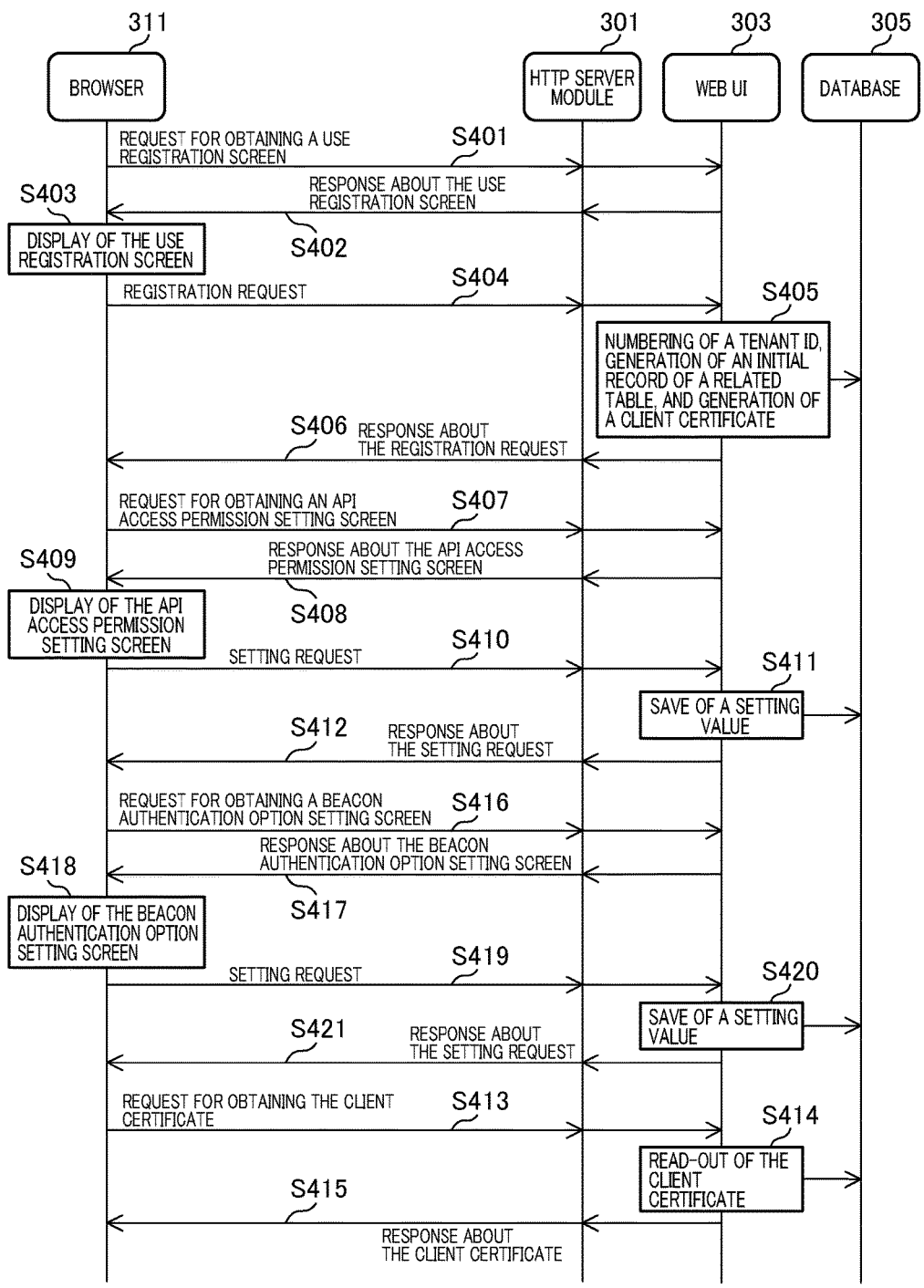
FIG. 4 is a sequence diagram of service use registration processing and each setting value registration processing.

Here, the description will return to step S416 shown in FIG. 4. The browser 311 requests the Web UI 303 to obtain a beacon authentication option setting screen 600 (step S416). Next, the browser 311 obtains the beacon authentication option setting screen 600 from the Web UI 303 (step S417), and displays it on the browser 311 (step S418). Additionally, when a detailed setting button on the beacon authentication option setting screen 600 is depressed, the browser 311 obtains a detailed setting screen 610 and displays it on the browser 311. Similarly, when a beacon determination condition setting button on the beacon authentication option setting screen 600 is depressed, the browser 311 obtains a beacon determination condition setting screen 700 and displays it on the browser 311.

Figure 6:
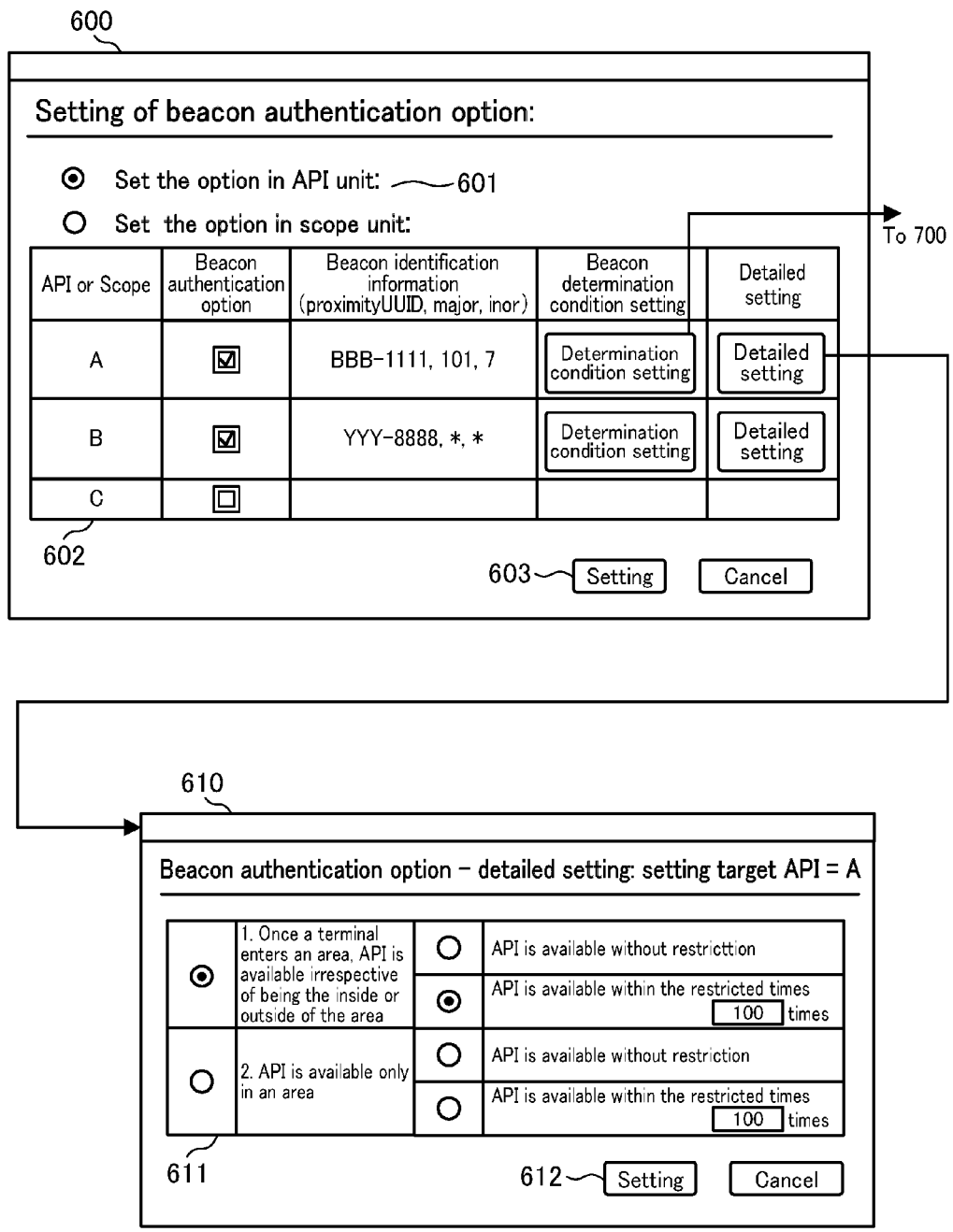
FIG. 6 illustrates an example of a beacon authentication option setting screen and a detailed setting screen.

Here, a description will be given of the beacon authentication option setting screen 600 shown in FIG. 6. A beacon authentication option selecting field 601 is a field that selects the beacon authentication option in either API unit or scope unit. A beacon information input field 602 displays a setting target API name when the API unit is selected in the beacon authentication option selecting field 601. The beacon information input field 602 is a field in which a selected value, which indicates valid or invalid of the beacon authentication option, and the beacon identification information for each API are entered.

In contrast, when the scope unit was selected in the beacon authentication option selecting field 601, a field that displays the setting target scope name and the selected value, which is valid or invalid of the beacon authentication option, is input and the beacon identification information for each scope is provided. When the setting button 603 is depressed, the setting request is transmitted from the browser 311 to the Web UI 303 (step S419). Subsequently, the value entered in the field is saved in the beacon authentication option management table shown in Table 5 (step S420), and the Web UI 303 responds to the setting request (Step S421).

Next, a description will be given of the detailed setting screen 610 of the beacon authentication options shown in FIG. 6. An available area selecting field 611 is a field that selects that the setting target API is available irrespective of whether the beacon is available the inside or outside of the area, or available only in the area, and sets the restricted number of API for each client ID in the selected available area. Subsequently, when the setting button 612 is depressed, the value that has been entered in the field is saved in the beacon authentication option management table shown in Table 5.

Figure 7:
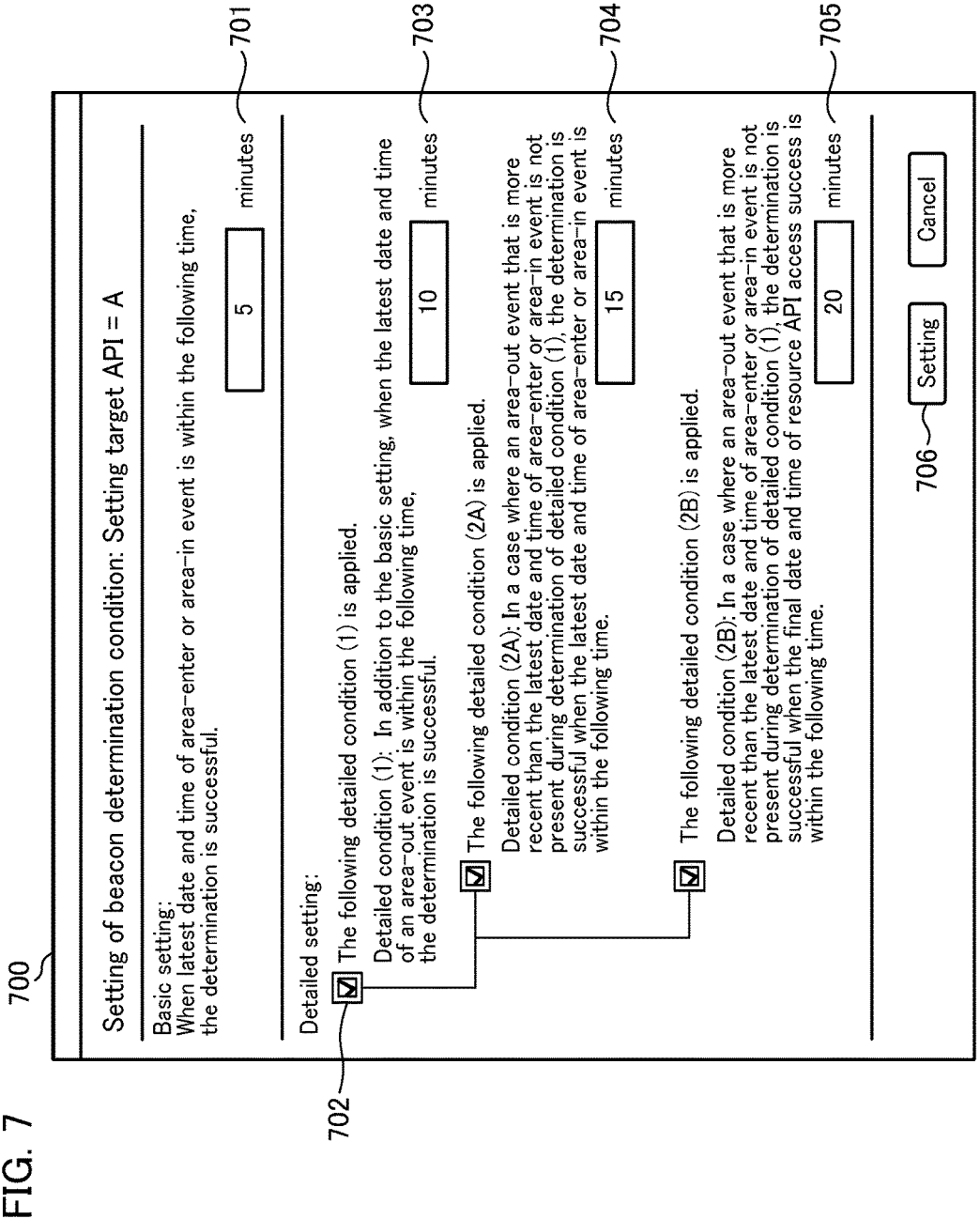
FIG. 7 illustrates an example of a beacon determination condition setting screen.

Next, a description will be given of a setting screen 700 of the beacon determination condition shown in FIG. 7. A time input field 701 used during determination is a field that enters a time used during determination by the basic setting of the beacon determination condition. A detailed condition selecting field 702 is a field that selects whether or not detailed conditions (1), (2A), and (2B) are applied. Note that only when the detailed (1) is selected, selecting (2A) and (2B) are possible.

Time input fields 703, 704, and 705 used during the determination of the detailed condition are fields in which a time used during the determination by the detailed conditions (1), (2A), and (2B) respectively is entered. When the setting button 706 is depressed, the value that has been entered in the field is saved in the beacon determination condition management table shown in Table 6. Additionally, in order to identify that each setting value in Table 6 corresponds to either one of the setting targets, API or scope, the association is performed using a common tenant ID and the beacon determination condition ID in Tables 5 and 6.

In the determination type ID column, in order to identify that the setting target has any condition among the basic setting and detailed setting (1), (2A), and (2B), BA001, OP001, OP002A, and OP002B, which are values corresponding to each type, are stored. Additionally, in the setting validation column, truth-values that have been selected with reference to each condition in the field 702 are stored.

Subsequently, in the determination time column, the values that have been entered in the fields 701 to 705 are stored.

Here, the description will return to step S413 shown in FIG. 4. The browser 311 transmits the obtaining request of the client certificate to the Web UI 303 (step S413). Subsequently, the Web UI 303 reads out the client certificate that has been made (step S414), and responds to the browser 311 (step S415).

Figure 8:
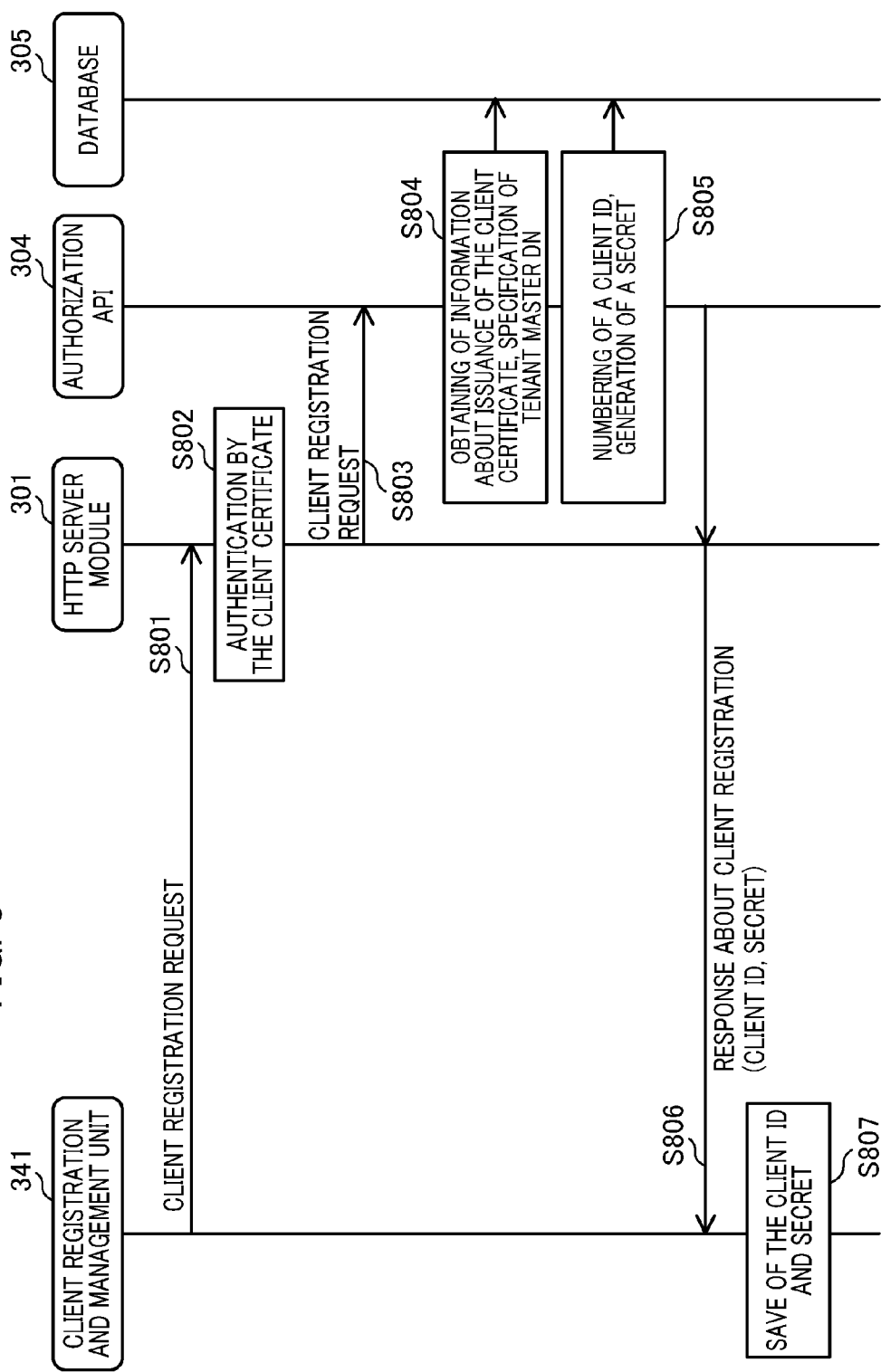
FIG. 8 is a sequence diagram of client registration processing.
Figure 9:
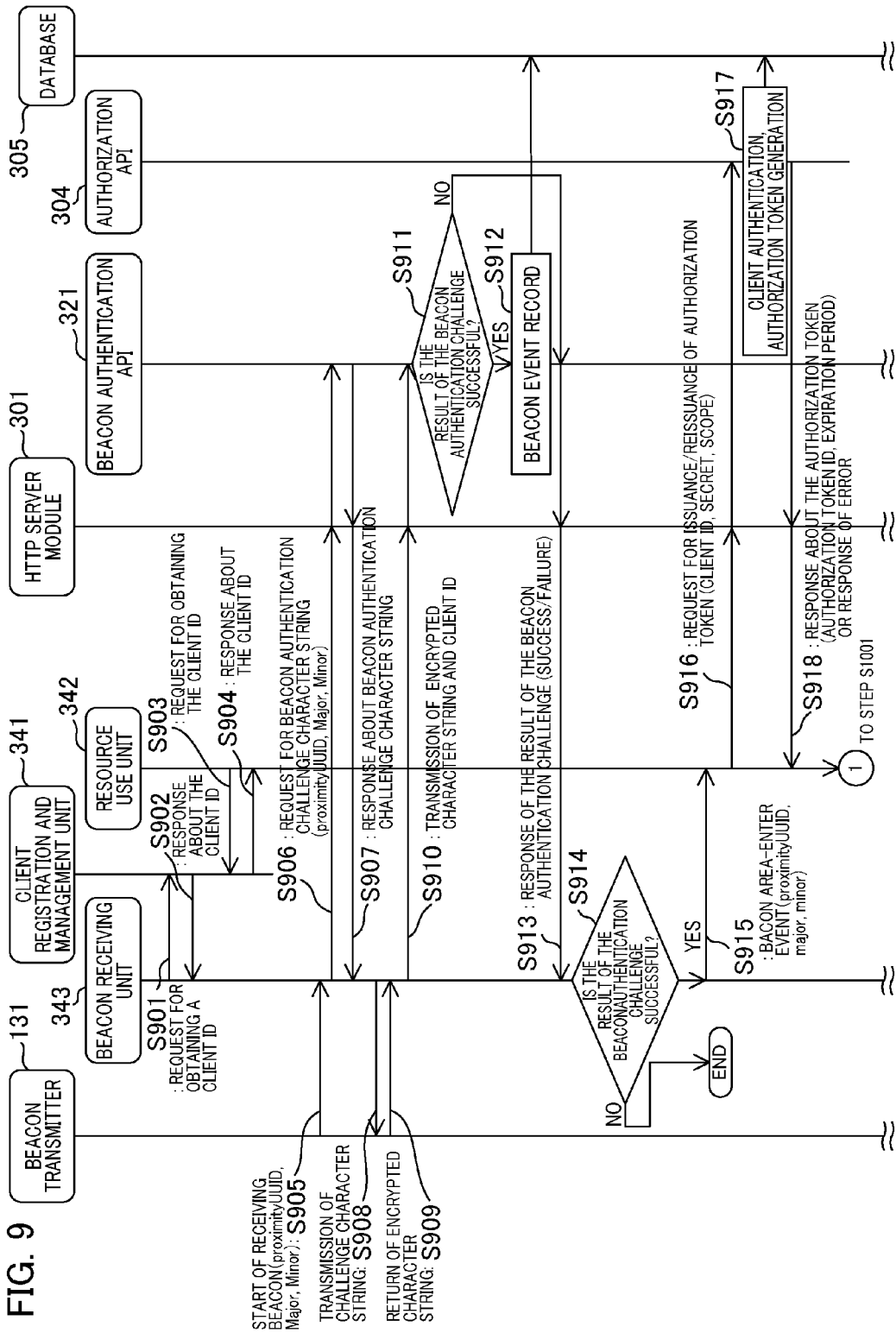
FIG. 9 is a sequence diagram of beacon receiving, event recording, and token issuing processing.

Next, with reference to FIG. 8, a description will be given of client registration processing and authorization token issuing processing. Note that the client certificate that has been obtained in advance is incorporated in the application 331 by a developer of the application 331, and the application 331 in which the client certificate has been incorporated is distributed to the client computer 122.

First, the client registration and management unit 341 transmits the client registration request to the HTTP server module 301 (step S801). Next, the HTTP server module 301 requests the call source to transmit the client certificate, in response to the client registration request. Subsequently, the client registration and management unit 341 transmits the client certificate to the HTTP server module 301. The HTTP server module 301 transmits the client registration request to the authorization API 304 (step S803) when the client certificate that has been received is valid (step S802).

In the present embodiment, although the client certificate is used for authenticating that the application 331 is a legitimate client of the application server 111, other authentication methods including Basic authentication or Digest authentication may be used. Subsequently, the authorization API 304 searches the client certificate management table shown in Table 4 by using a serial number obtained from the client certificate that has been received, and specifies the tenant master DN. Moreover, the authorization API 304 searches the client management table shown in Table 3, and obtains a record having a DN that is the same as the above specified tenant Master DN (step S804).

Next, the authorization API 304 verifies that the client type of the obtained record is "master", and reads out the tenant ID of the record. The authorization API 304 adds the record to the client management table shown in Table 3, assigns a unique ID as typified by "UUID", and stores it in the client ID column.

Additionally, the authorization API 304 stores the tenant ID that has been read out in the tenant ID column. The authorization API 304 then stores a secret that has been automatically generated in a secret column, and stores "general user" in the type column (step S805).

Next, the authorization API 304 returns the generated client ID and secret to the client registration and management unit 341 as a response to the client registration request (step S806). The client registration and management unit 341 saves the client ID and secret that have been received in a storage region so as to be readable (step S807).

The above is the process for registering the application 331 in the application server 111 as a client. By the process described above, only legitimate clients having a client certificate that has been issued by the application server 111 can be registered in the application server 111 as a client.

Next, with reference to FIGS. 9, 10, 11, 12, 13 and 14, a description will be given of a process in which, when the mobile terminal enters the area of beacon, beacon authentication is executed, the issuance of the authorization token is requested when beacon authentication is successful, and the resource API is called by using the authorization token. First, the beacon receiving unit 343 and the resource use unit 342 request the client registration and management unit 341 to obtain the client ID (step S903). Subsequently, they obtain the client ID from the client registration and management unit 341, and save it so as to be available (step S904).

Next, the beacon receiving unit 343 receives and detects a beacon that is transmitted from the beacon transmitter 131 (step S905). Additionally, when the beacon receiving unit 343 detects the reception, it obtains the values of Proximity UUID, Major, Minor, which are beacon identification information. The beacon receiving unit 343 then performs beacon authentication processing for confirming whether or not the beacon transmitter is legitimate. Although various means can be used in order to determine whether or not the beacon transmitter is legitimate, in the present embodiment, an embodiment in which the beacon authentication is performed by means in which the beacon transmitter and the beacon authentication API hold a same secret key in advance is described.

First, the beacon receiving unit 343 transmits the request of a beacon authentication challenge character string to the beacon authentication API 321 together with the beacon identification information (step S906). Next, the beacon authentication API 321 responds with the beacon authentication challenge character string (step S907). Subsequently, the beacon receiving unit 343 transmits the challenge character string with which the beacon authentication API 321 has responded to the beacon transmitter 131 (step S908). Next, the beacon transmitter 131 encrypts the received challenge character string by using the secret key, and returns it to the beacon receiving unit 343 as an encrypted character string (step S909). The beacon receiving unit 343 then transmits the encrypted character string and the client ID to the beacon authentication API 321 (step S910).

Next, the beacon authentication API 321 determines whether or not, concerning the received encrypted character string, the challenge character string is encrypted with a predetermined secret key (step S911). When the challenge character string has been encrypted with the predetermined secret key (YES), the beacon authentication API 321 records the date and time, beacon identification information, event, and client ID in the beacon event management table shown in Table 7 (step S912). Subsequently, the beacon authentication API 321 responds to the beacon receiving unit 343 that the result of beacon authentication challenge was successful (step S913).

In contrast, in step S911, when the challenge character string has not been encrypted with the predetermined secret key (NO), the beacon authentication API 321 responds to the beacon receiving unit 343 that the result of beacon authentication challenge is a failure. Next, the beacon receiving unit 343 determines whether or not the result of the beacon authentication challenge is successful based on the received response (step S914). Subsequently, when the result of the beacon authentication challenge is a failure (NO), the process stops because the beacon is not legitimate. In contrast, when the result of the beacon authentication challenge is successful (YES), the area-enter event of a beacon is reported to the resource use unit 342 together with the beacon identification information (step S915).

Next, the resource use unit 342 starts the process of service provided to the terminal that has entered the area of the corresponding beacon, based on the received beacon identification information. For example, it is possible to switch between various service processing, for example, the delivery of coupons when the user visits the store, and the delivery of today's schedule when the user arrives at the office, based on the beacon identification information.

Next, the resource use unit 342 transmits the request of the issuance of an authorization token to the authorization API 304 together with the client ID, secret, and parameters of the scope (step S916). Subsequently, the authorization API 304 verifies that the received client ID and secret exist in the client management table shown in Table 3 and that they match, and authenticates the client of the request source. When the authentication is successful, the record is added to the authorization token management table shown in Table 8, and the authorization token is generated (step S917).

Additionally, a newly numbered authorization token ID, the scope in the received parameter, the received client ID, and the date and time of the expiration period of the authorization token are stored in the added record. The authorization API 304 then responds to the resource use unit 342 with reference to the authorization token request (step S918). When the client authentication in step S917 is a failure, the authorization API 304 returns an error response. In contrast, when the client authentication is successful, the authorization API 304 returns the authorization token ID and expiration period. Additionally, in step S916, although the resource use unit 342 already holds the authorization token, when the expiration period has expired, the authorization token is reissued by the flow that is the same as the above process. Subsequently, the process proceeds to step S1001.

Figure 10:
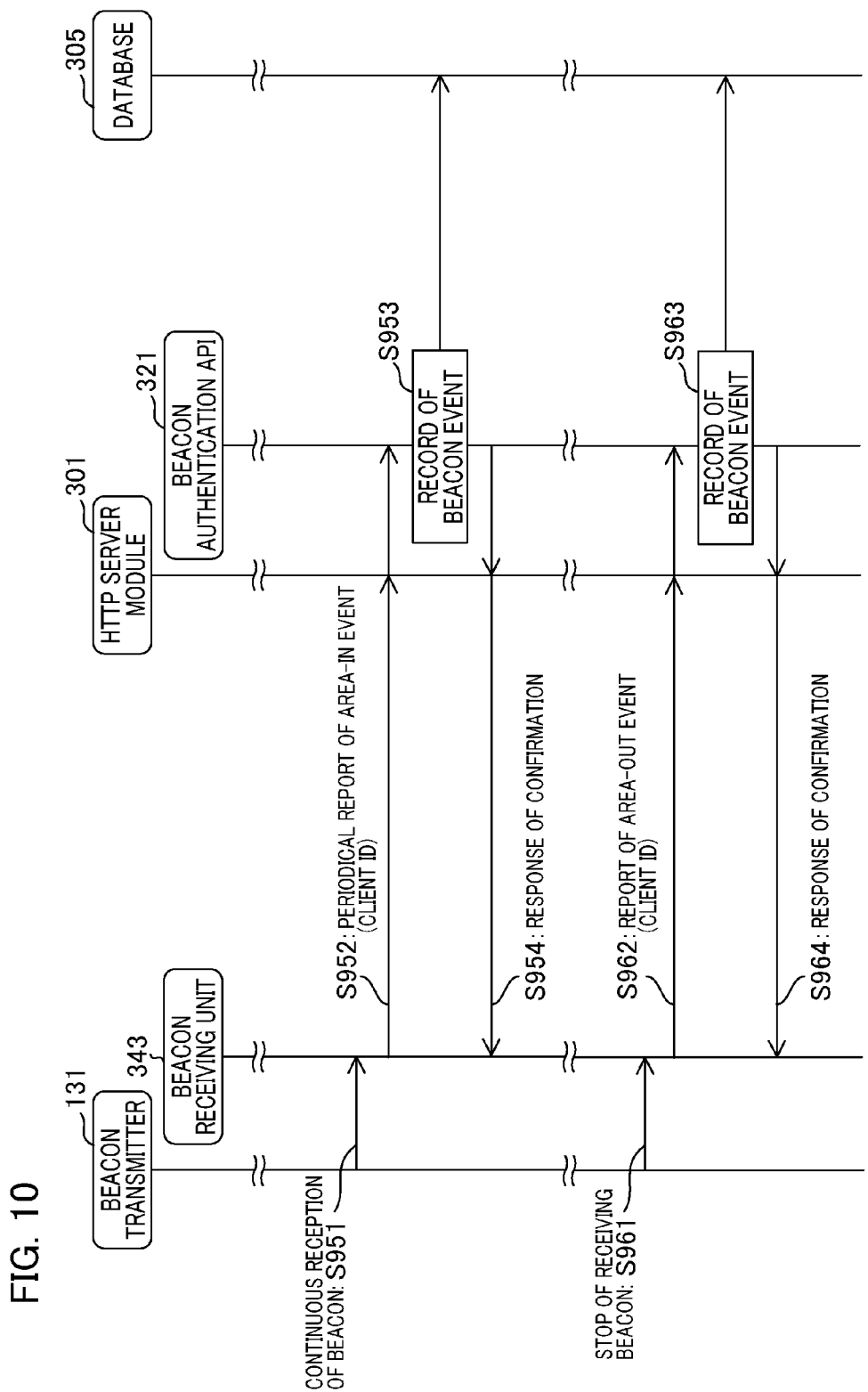
FIG. 10 is a sequence diagram of processing when a terminal stays in an area or moves outside of the area.

Here, with reference to FIG. 10, a description will be given of a beacon event record when the terminal is continuously staying in the area of beacon, and when it moved outside of the area of beacon. First, while the beacon receiving unit 343 is continuously receiving the beacon from the beacon transmitter 131 (step S951), the beacon receiving unit 343 periodically reports an area-in event to the beacon authentication API 321 (step S952).

Next, the beacon authentication API 321 records the date and time, beacon identification information, event, and client ID in the beacon event management table shown in Table 7 (step S953), and responds with the confirmation to the beacon receiving unit 343 (step S954). In contrast, when the beacon receiving unit 343 stops the reception of beacon from the beacon transmitter 131 (step S961), the beacon receiving unit 343 reports an area-out event to the beacon authentication API 321 (step S962). In this context, "area-out" indicates that the beacon has moved outside of the area at which the beacon is receivable.

Next, the beacon authentication API 321 records the date and time, identification information of beacon that stops the reception in the beacon event management table shown in Table 7, and records "area-out" and the received client ID in the content of the event (step S963). The beacon authentication API 321 responds with the confirmation to the beacon receiving unit 343 (step S964).

Figure 11:
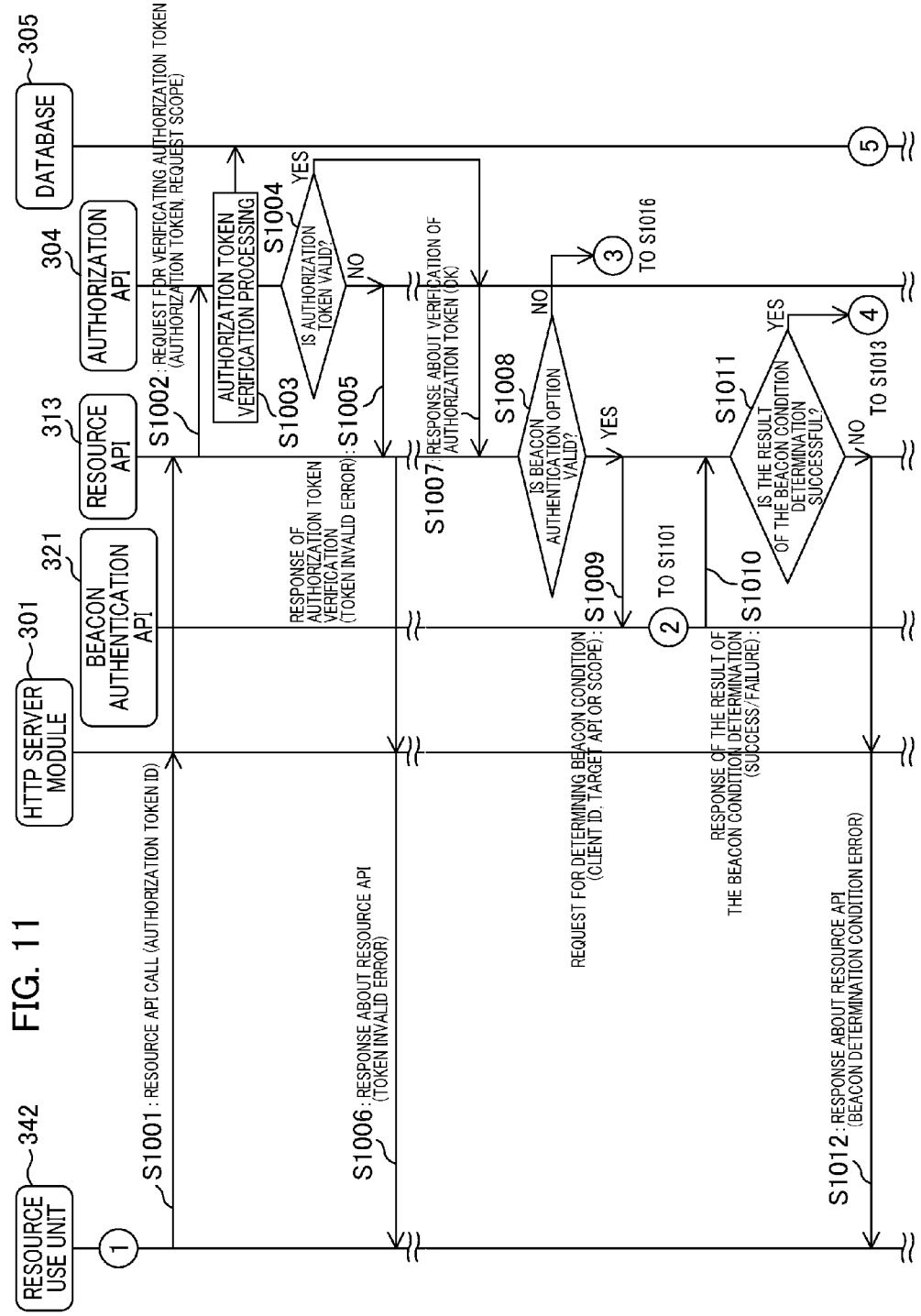
FIG. 11 is a sequence diagram of token verification processing and beacon condition determination result processing.

Next, a description will be given of token verification processing shown in FIG. 11. The resource use unit 342 transmits the request of calling the resource API to the resource API 313 together with the authorization token ID (step S1001). Next, the resource API 313 transmits the request scope that is necessary for API access to the authorization API 304 as an authorization token verification request, based on the received authorization token ID and the scope setting field 512 (step S1002).

Next, the authorization API 304 searches the authorization token management table shown in Table 8, and verifies that a record having an authorization token ID of the received approved token exists and the current date and time is within a predetermined time. Additionally, the authorization API 304 confirms that the client ID that is the issuing destination of the authorization token exists in the client management table shown in Table 3, and confirms that the corresponding client ID is valid (step S1003). The authorization API 304 then determines whether or not the received authorization token is valid based on the result for the verification processing in step S1003 (step S1004).

When the received authorization token is not valid (NO), the authorization API 304 responds with token invalid error to the resource API 313 as the result for the authorization token verification (step S1005). The resources API 313 returns the token invalid error to the resource use unit 342 as a response to the resource API call (step S1006).

In contrast, when the received authorization token is valid (YES), the authorization API 304 returns the response of the authorization token verification "OK" to the resource API 313 (step S1007). Subsequently, the resource API 313 specifies the API name and target scope for the API that was called in step S1001 if the scope is used, based on the scope setting of the scope use selecting field 511 and the scope setting field 512. Additionally, if the scope is not used, the resource API 313 specifies the target API name.

Next, the resource API 313 searches the beacon authentication option management table shown in Table 5, and obtains a record in which a value of the setting target column matches the specified API or scope. Subsequently, the resource API 313 obtains a value from the option setting column of the obtained record, and determines whether or not the beacon authentication option is valid for the specified API or scope (step S1008). When the beacon authentication option is not valid (NO), the process proceeds to step S1016. In contrast, when the beacon authentication option is valid (YES), the resource API 313 transmits the client ID and the target API or scope to the beacon authentication API 321 as a beacon condition determination request (step S1009). Subsequently, the process proceeds to step S1101 shown in FIG. 13.

Next, the beacon authentication API 321 obtains the beacon identification information that is an authorization target to the target API or scope from the beacon authentication option management table shown in Table 5. Additionally, the beacon authentication API 321 obtains a record in which the client ID included in the received beacon condition determination request matches the obtained beacon identification information, and the content of the event is "area-enter" or "area-in", from the beacon event management table shown in Table 7 (step S1101). In this context, the "area-enter" indicates that the terminal has entered an area in which the beacon is receivable, and the "area-in" indicates that the mobile terminal stays in an area in which the beacon is receivable. That is, the beacon authentication API 321 obtains a record having a content of event based on the received beacon. Subsequently, the beacon authentication API 321 responds with the obtained record to the beacon authentication API 321 (step S1102).

Next, the beacon authentication API 321 refers to the beacon authentication option management table shown in Table 5, obtains a value of available area restriction type corresponding to the target API or scope, and determines that the restriction type is either "1" or "2" (step S1103). When the restriction type is "1", the beacon authentication API 321 determines whether or not the number of the record obtained in step S1102 is 1 or more (step S1104). When the number of the obtained record is not 1 or more (NO), the process proceeds to step S1118 shown in FIG. 14, and the beacon authentication API 321 sets the beacon condition determination to "failure" (step S1118). When the number of the obtained record is 1 or more (YES), the process proceeds to step S1117 shown in FIG. 14, and the beacon authentication API 321 sets the beacon condition determination to "success" (step S1117).

Figure 13:
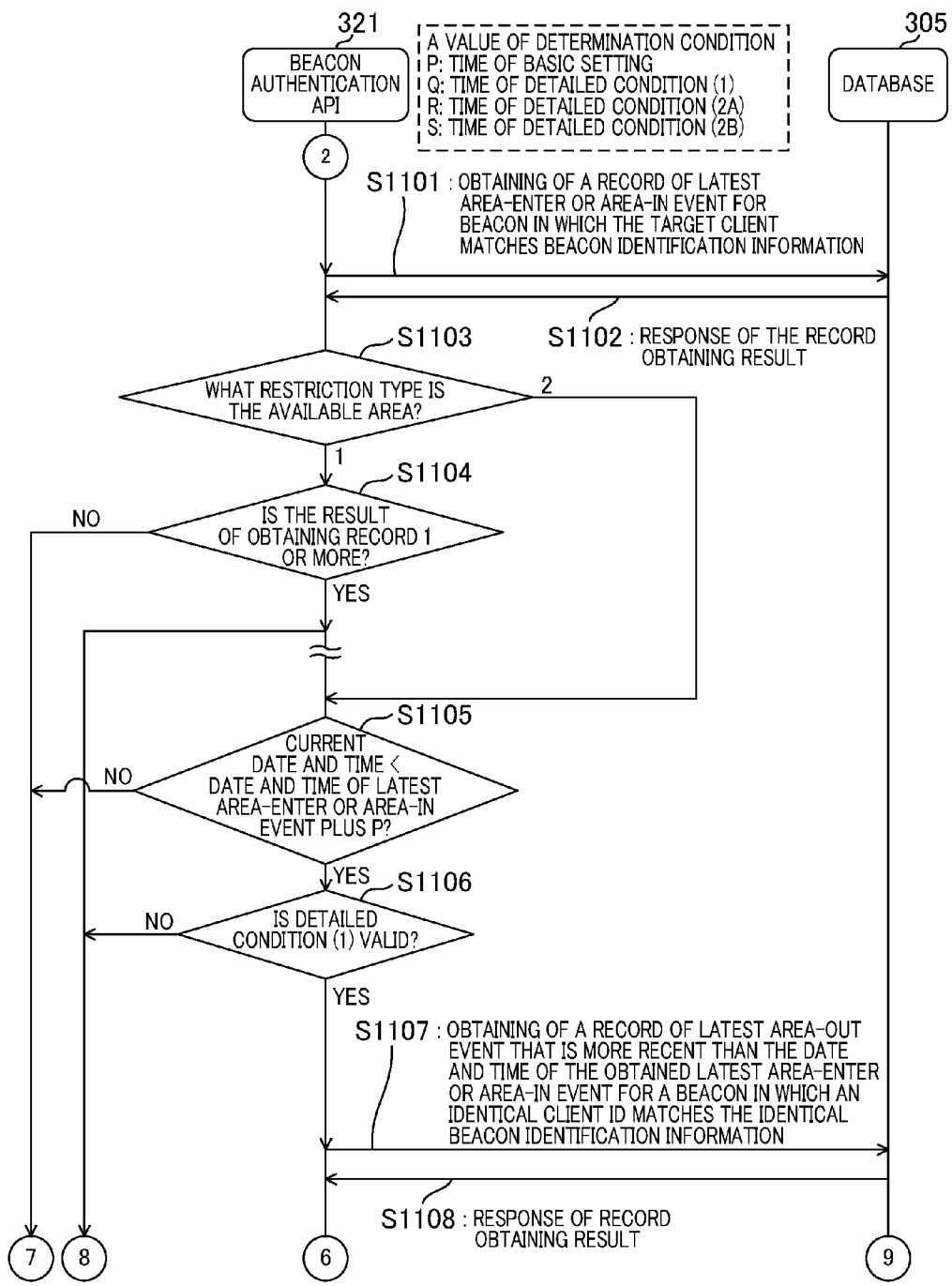
FIG. 13 is a sequence diagram of beacon condition determination processing.

In contrast, when the restriction type is "2" in step S1103 shown in FIG. 13, the process proceeds to step S1105. When the restriction type is "2", the beacon authentication API 321 determines whether or not the setting is for permitting the use of the resource API only in the area, and the current date and time is within a time obtained by adding time P of the basic setting to the date and time of the latest area-enter or area-in event (step S1105). Note that time P of the basic setting indicates a value of the determination time of a record having BA001 as the determination type ID of the beacon determination condition management table shown in Table 6.

In step S1105, when the current date and time is not within a time obtained by adding time P of the basic setting to the date and time of the latest area-enter or area-in event (NO), the process proceeds to step S1118 shown in FIG. 14. Otherwise, it is assumed that the current date and time is within a time obtained by adding time P of the basic setting to the date and time of the latest area-enter or area-in event (YES). In this case, the beacon authentication API 321 determines whether or not a value of the setting validation column of the record having OP001 as the setting type ID of the beacon determination condition management table shown in Table 6 is true (valid) (step S1106). When the value of the setting validation column is not true (invalid) (NO), the process proceeds to step S1117 shown in FIG. 14. In contrast, when the value of the setting validation column is true (valid) (YES), the process proceeds to step S1107.

Next, in step S1102, the beacon authentication API 321 obtains a record of latest area-out event for a beacon in which an identical client ID matches identical beacon identification information, which is newer than the date and time of the obtained latest area-enter or area-in event (step S1107). Subsequently, the database 305 responds with the record obtaining result to the beacon authentication API 321 (step S1108). The process then proceeds to step S1109 shown in FIG. 14. The beacon authentication API 321 determines whether or not the record obtaining result is 0 (step S1109).

When the record obtaining result is not 0 (NO), the beacon authentication API 321 determines whether or not the current date and time is within a time obtained by adding time Q of the detailed condition (1) to the date and time of the latest area-out event that was obtained by the current date and time (step S1110). Note that the time Q of the detailed condition (1) is a value of the determination time of the record having OP001 serving as the determination type ID of the beacon determination condition management table shown in Table 6.

When the current date and time is not within a time obtained by adding time Q of the detailed condition (1) to the date and time of the latest area-out event (NO), the process proceeds to step S1118. In contrast, when the current date and time is within the time obtained by adding time Q of the detailed condition (1) to the date and time of the latest area-out event (Yes), the process proceeds to step S1117.

In contrast, when the record obtaining result is 0 (YES), the process proceeds to step S1111. The beacon authentication API 321 then determines whether or not the value of the setting validation column of the record having OP002A as the setting type ID of the beacon determination condition management table shown in Table 6 is true (valid) (step S1111). When the value of the setting validation column is true (valid) (YES), the beacon authentication API 321 determines whether or not the current date and time is within a time obtained by adding a predetermined time, for example, adding time R of the detailed condition (2) to the date and time of latest area-enter or area-in event obtained in step S1102 (step S1112). Note that time R of the detailed condition (2A) is a value of the the determination time of the record having OP002A serving as the determination type ID of the beacon determination condition management table shown in Table 6.

When the current date and time is within a time obtained by adding time R of the detailed condition (2) to the date and time of the latest area-enter or area-in event (YES), the process proceeds to step S1117. When the current date and time is not within the time obtained by adding time R of the detailed condition (2) to the date and time of the latest area-enter or area-in event (NO), the process proceeds to step S1113.

In contrast, when the value of the setting validation column is not true (invalid) (NO) in the determination of step S1112, the process proceeds to step S1113. Subsequently, the beacon authentication API 321 determines whether or not the value of the setting validation column of the record having OP002B as the setting type ID of the beacon determination condition management table shown in Table 6 is true (valid) (step S1113).

When the value of the setting validation column is not true (invalid) (NO), the process proceeds to step S1118.

In contrast, when the value of the setting validation column is true (valid) (YES), the beacon authentication API 321 obtains a record having an identical client ID and target API from the API call number management table shown in Table 9 (step S1114). Subsequently, the database 305 responds with the final access success date and time to the beacon authentication API 321 (step S1115).

Next, the beacon authentication API 321 determines whether or not the current date and time is within a time obtained by adding time S of the detailed condition (2B) to the final access success date and time (final obtained date and time) that was obtained by the current date and time (step S1116). Note that time S of the detailed condition (2B) is a value of the determination time of the record having OP002B serving as the determination type ID of the beacon determination condition management table shown in Table 6.

When the current date and time is not within a time obtained by adding time S of the detailed condition (2B) to the final access success date and time obtained by the current date and time (NO), the process proceeds to step S1118. In contrast, when the current date and time is within the time obtained by adding time S of the detailed condition (2B) to the final access success date and time obtained by the current date and time (YES), the process proceeds to step S1117.

Here, the a description will return to FIG. 11, and the beacon authentication API 321 responds with the beacon condition determination result that was set in step S1117 or step S1118 to the resource API 313 (step S1010). The resource API 313 then determines whether or not the received beacon condition determination result is successful (step S1011). Subsequently, the process proceeds to step S1012 shown in FIG. 12. When the beacon condition determination result is not successful (NO), the resource API 313 returns beacon determination condition error to the resource use unit 342 (step S1012). That is, because the condition of the resource use permission by beacon is not met, the use of resource API is not permitted.

Figure 12:
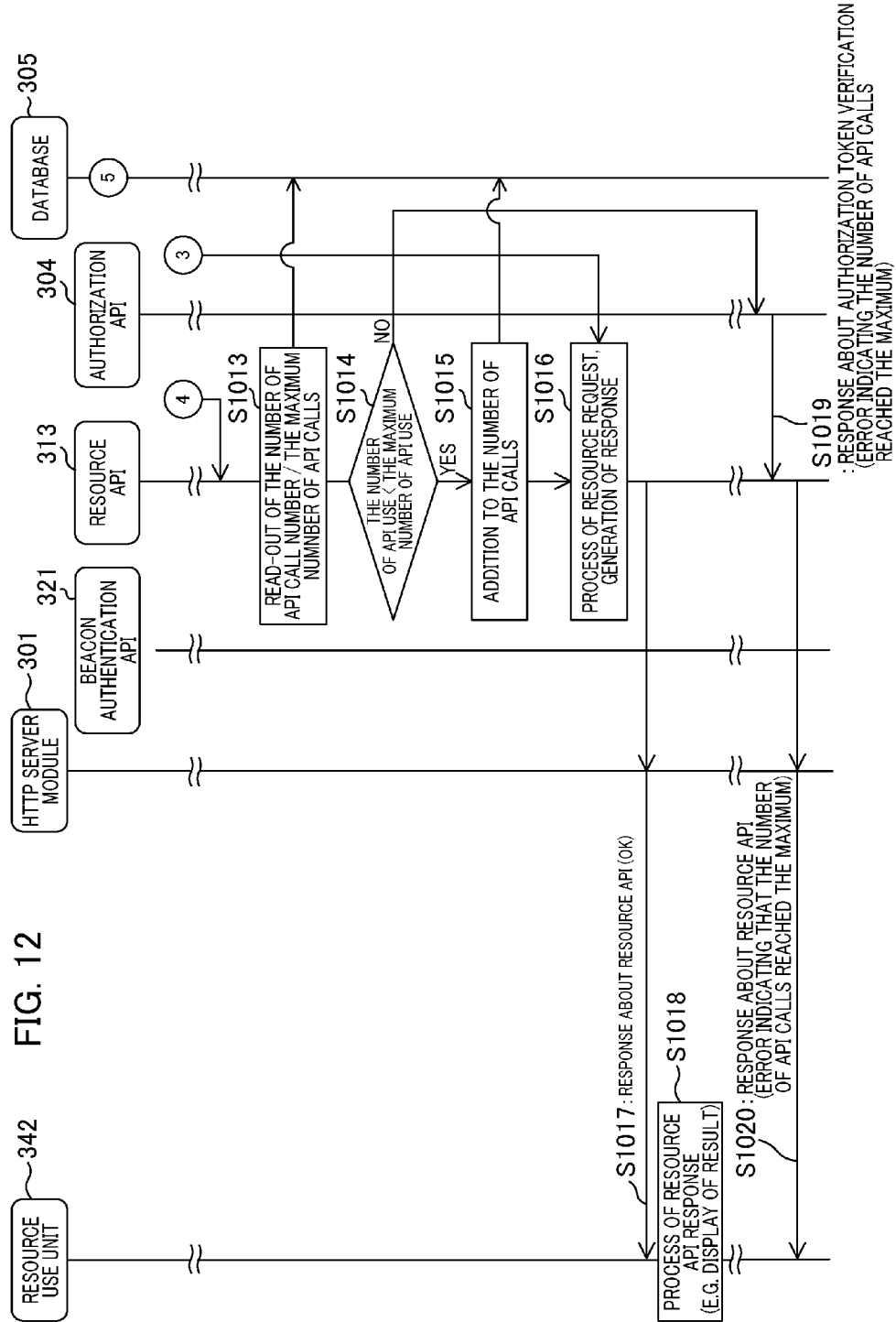
FIG. 12 is a sequence diagram of resource request API processing.

In contrast, when the beacon condition determination result is successful (YES), the process proceeds to step S1013 shown in FIG. 12. The resource API 313 reads out a value of the API use number column of the target client ID or the API in the API call number management table shown in Table 9, and the maximum number API use of the beacons authentication option management table shown in Table 5 (step S1013). Subsequently, the resource API 313 determines whether or not the number of the API use that has been read out is smaller than the API use maximum number (step S1014).

When the number of the API uses is greater than the maximum number of API use (NO), the authorization API 304 returns an error indicating that the number of API calls has reached the maximum to the resource API 313 as a response for authorization token verification (step S1019). Subsequently, the resource API 313 returns an error indicating that the number of API calls has reached the maximum to the resource use unit 342 as a resource API response (step S1020).

In contrast, when the number of API uses is less than the maximum number for API uses, the resource API 313 adds 1 to the value of the API use number column, which is the client ID and API for the API call number management table shown in Table 9 (step S1015). Subsequently, the resource API 313 executes the process of the resource request received in step S1001, and generates a response (step S1016).

Next, the resources API 313 returns the resource request response and API call success (OK) generated in step S1016 to the resource use unit 342 as a response to the resource request API call (step S1017). Subsequently, the resource use unit 342 executes the process of the received resource API response (step S1018). For example, in accepting the delivery of coupons, the resource use unit 342 executes the process that has been already determined by the use case, for example, the display of the coupon on the screen of the application 331, or the obtained resource.

As described above, according to the present embodiment, the application server 111 provides an API authorization that conforms to the authorization flow of OAuth 2.0, in response to the API use request to the resource API 313. In particular, the client ID is settable for each application 331 of the client computer 122, and in accordance with the identification information of the beacon received for each client ID, the range or number of available resource API can be permitted and restricted. Particularly, in using BaaS, the developer of the application for mobile terminals sets the beacon authentication options for each API or scope. Consequently, it is possible to easily make the area detection of the beacon and the use and authorization and the restriction of the number of use of the resource API that conforms to authentication flow of OAuth 2.0 cooperate together.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-003514, filed Jan. 9, 2015, which is hereby incorporated by reference wherein in its entirety.

What is claimed is:

1. An information processing system that provides a resource to an application of a terminal through a network, comprising:
the terminal;
a transmitter that transmits a beacon;
a server that provides the resource to the application of the terminal through the network in an area of the beacon transmitted from the transmitter; and
at least one processor executing computer executable instructions or at least one circuit which function as:
a first authentication unit configured to execute a first authentication process by obtaining identification information of the beacon for authenticating the transmitter, transmitting the obtained identification information of the beacon by the terminal to the server, when the terminal enters an area of the beacon transmitted from the transmitter and receives the beacon, and authenticating the transmitter using the identification information of the beacon;
an event reporting unit configured to report an event which indicates the terminal entered the area of the beacon transmitted from the transmitter authenticated in the first authentication process;
a reception unit configured to receive identification information of the terminal to be used in a second authentication process for authenticating the terminal and a request for issuance of an authorization token after the event is reported by the event reporting unit;
a second authentication unit configured to execute the second authentication process of authenticating the terminal by using the identification information of the terminal; and
an authorization unit configured to issue an authorization token after the authentication is successfully performed in the second authentication process,
wherein the authorization unit verifies whether or not the authorization token is valid when there is a call request for the resource from the terminal by using the authorization token, and
wherein the second authentication unit permits the application of the terminal to use the resource in accordance with content of an event based on the beacon after the authorization unit verifies that the authorization token is valid.

2. The information processing system according to claim 1, wherein the authorization unit issues the authorization token that permits the call of only the resource within a range of a specified scope.

3. The information processing system according to claim 1, wherein the authorization unit performs a report to the terminal if the number of uses of the resource is larger than a maximum number of the uses of the resource to which the number of uses of the resource has been set in advance.

4. The information processing system according to claim 1, wherein the second authentication unit obtains any one of the terminal entering an area at which the beacon is receivable, the terminal staying in the area, and the terminal having moved outside of the area, as at least the event.

5. The information processing system according to claim 4, wherein the second authentication unit permits the application of the terminal to use the resource when a current date and time is within a time obtained by adding a predetermined time to a date and time of the event.

6. The information processing system according to claim 4, wherein the second authentication unit permits the application of the terminal to use the resource when a current date and time is within a time obtained by adding a predetermined time to a final obtaining date and time of the event.

7. The information processing system according to claim 4, wherein the authorization unit permits the use of resources only in the area.

8. A control method of an information processing system that provides a resource to an application of a terminal through a network, the system comprising the terminal, a transmitter that transmits a beacon, and a server that provides the resource to an application of the terminal through the network in an area of the beacon transmitted from the transmitter, the method comprising:
executing a first authentication process by obtaining identification information of the beacon to be used in the first authentication process for authenticating the transmitter, transmitting the obtained identification information of the beacon by the terminal to the server when the terminal enters an area of the beacon transmitted from the transmitter and receives the beacon, and authenticating the transmitter using the identification information of the beacon;
reporting an event which indicates the terminal entered the area of the beacon transmitted from the transmitter authenticated in the first authentication process;
receiving identification information of the terminal to be used in a second authentication process for authenticating the terminal and a request for issuance of an authorization token after the event is reported;
executing the second authentication process by using the identification information of the terminal;
issuing an authorization token after the authentication of the terminal is successfully performed in the second authentication process;
verifying whether or not the authorization token is valid when there is a call request for the resource from the terminal by using the authorization token; and
permitting the application of the terminal to use the resource in accordance with content of an event based on the beacon after the authorization token is verified to be valid by the verifying process.

9. A non-transitory storage medium storing a computer-readable program for causing a computer to execute a control method of an information processing system that provides a resource to an application of a terminal via a network, the system comprising the terminal, a transmitter that transmits a beacon, and a server that provides the resource to an application of the terminal through the network in an area of the beacon transmitted from the transmitter, the program comprising code for executing:
- a first authentication process by obtaining identification information of the beacon to be used in the first authentication process for authenticating the transmitter, transmitting the obtained identification information of the beacon by the terminal to the server when the terminal enters an area of the beacon transmitted from the transmitter and receives the beacon, and authenticating the transmitter using the identification information of the beacon;
- reporting an event which indicates the terminal entered the area of the beacon transmitted from the transmitter authenticated in the first authentication process;
- receiving identification information of the terminal used in a second authentication process for authenticating the terminal and a request for issuance of an authorization token after the event is reported;
- the second authentication process by using the identification information of the terminal;
- issuing an authorization token after the authentication of the terminal is successfully performed in the second authentication process;
- verifying whether or not the authorization token is valid when there is a call request for the resource from the terminal by using the authorization token; and
- permitting the application of the terminal to use the resource in accordance with content of an event based on the beacon after the authorization token is verified to be valid by the verifying process.

10. The information processing system according to claim 1, wherein the first authentication unit sends to the terminal the identification information of the beacon and a character string which is issued in the information processing system, and verifies an encrypted character string sent from the terminal to perform authentication of the transmitter.

11. The information processing system according to claim 1, wherein the process is terminated when the authentication of the transmitter fails by the first authentication unit.

* * * * *